F. E. WELLMAN.
OIL REFINING APPARATUS.
APPLICATION FILED JULY 22, 1916.

1,275,337.

Patented Aug. 13, 1918.
5 SHEETS—SHEET 1.

Inventor
Frank E. Wellman
By Edward E. Clement
Attorney

UNITED STATES PATENT OFFICE.

FRANK E. WELLMAN, OF KANSAS CITY, KANSAS, ASSIGNOR TO THE KANSAS CITY GASOLINE COMPANY, OF KANSAS CITY, KANSAS, A CORPORATION OF KANSAS.

OIL-REFINING APPARATUS.

1,275,337.  Specification of Letters Patent.  Patented Aug. 13, 1918.

Application filed July 22, 1916. Serial No. 110,796.

*To all whom it may concern:*

Be it known that I, FRANK E. WELLMAN, a citizen of the United States, residing at Kansas City, in the county of Wyandotte and State of Kansas, have invented certain new and useful Improvements in Oil-Refining Apparatus, of which the following is a specification, reference being had therein to the accompanying drawing.

My invention relates to apparatus for the treatment of mineral oils and has for its object the provision of means for superheating and cracking hydrocarbons, which shall be efficient and safe with respect both to the apparatus itself and the operators.

In order to attain my object, I provide means constituting the principal feature of the invention, whereby the pressure, temperature, and operation of the apparatus may be observed and controlled from a distance by an operator or operators who at the same time are constantly protected from the effect of any fire, explosion, or other accidents which may chance to occur.

Very briefly stated, the invention includes a still or superheater inclosed within protective walls, and having connected with it passages and chambers, with peep-holes, indicating instruments, and controlling apparatus so arranged that the operator may readily observe, have access to, and control, all operative parts of the still, without leaving the walled-in passage ways or chambers.

In its broadest aspect, as will sufficiently appear from the following detail description, the operator need not be in direct proximity to the still, but may be located at a distance therefrom. I shall therefore claim means for distant or detached observation and control.

My invention is illustrated in the accompanying drawings in which—

Figure 1:
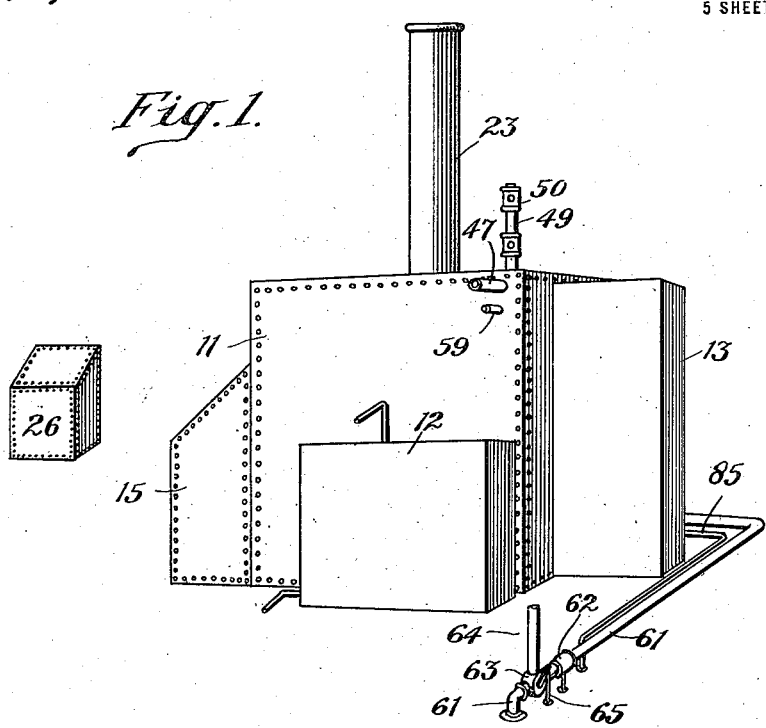
Figure 1 is a front perspective view of the outside of the superheater housing.
Figure 2:
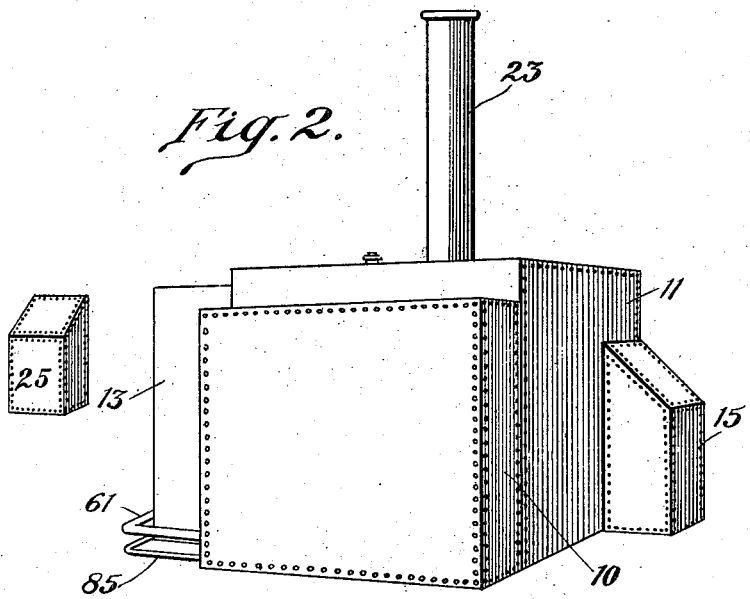
Fig. 2 is a rear perspective view of the same.
Figure 3:
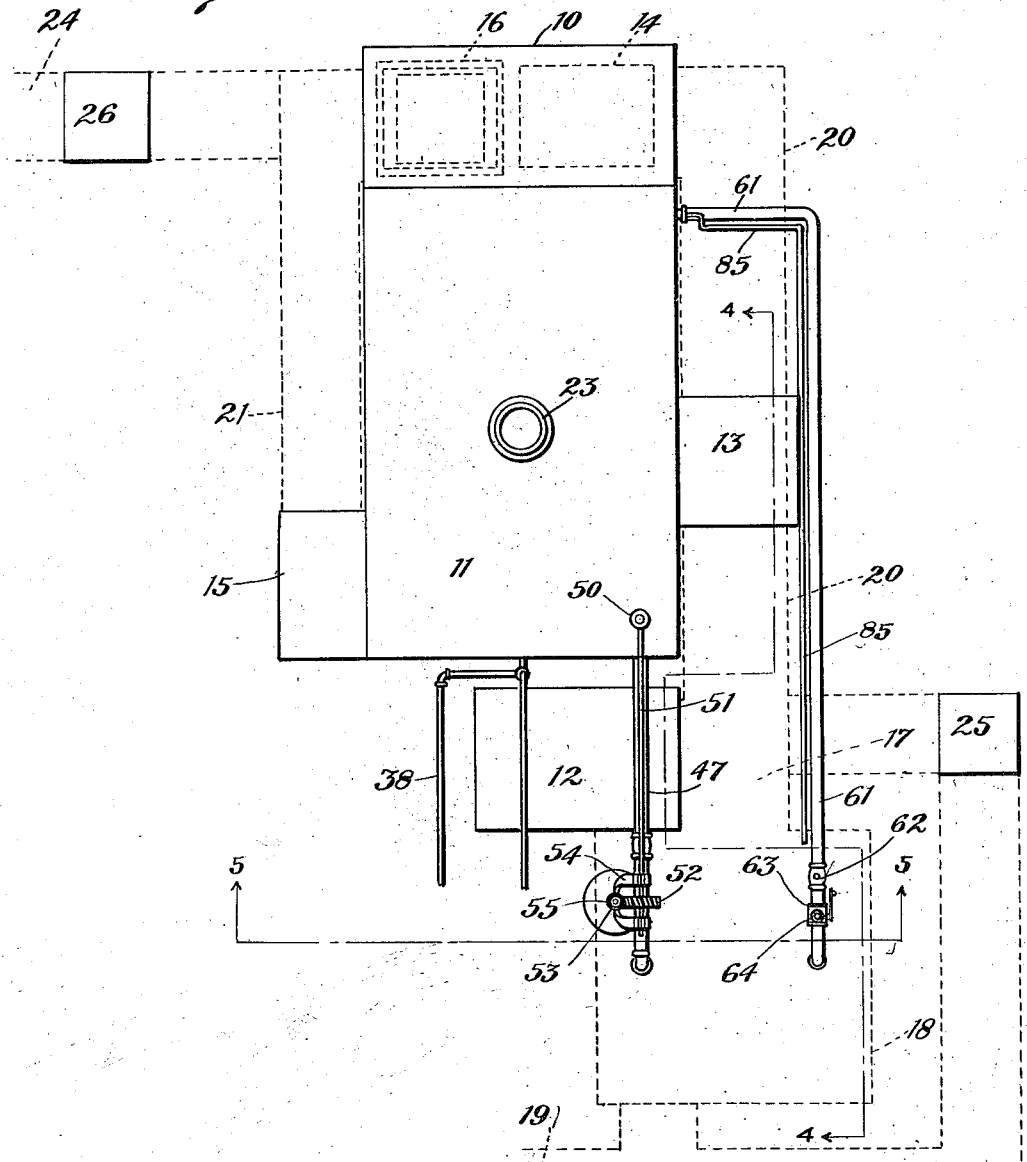
Fig. 3 is a plan of the superheater showing the tunnels and underground chambers in dotted lines.

Referring in detail to the drawings, 11 indicates the superheater housing which contains a suitable superheater coil and furnace therefor, not shown, but which is preferably of the type disclosed in my copending application Serial No. 69,500, filed December 30, 1915. The products of combustion are drawn off from the superheater through the stack 23, and the material to be heated enters the superheater through an inlet pipe 49 and leaves through an outlet pipe 61. The fuel supply enters through the pipes 44, 45 and is controlled from the fireman's vestibules 12. Observation of the interior of the superheater housing is had from the side observation vestibule 13, and the rear observation vestibule 14 (Figs. 3 and 6), while entrance to the superheater housing is afforded, for purposes of cleaning and repair, through the cleaner's front and rear vestibules 15 and 16 respectively.

An underground passage or tunnel 20 connects the vestibules 12, 13 and 14 for the purpose of enabling the operator to enter and leave these vestibules without exposing himself in the open space above the ground which would be a zone of danger in case of an explosion of the superheater due to a leakage or excessive pressure therein. Similarly, the cleaner's vestibules 15 and 16 are connected by a tunnel 21. These tunnels 20 and 21, where several superheaters are used, have extensions to the duplicate apparatus as indicated at 19 and 24, and are preferably isolated from each other and entered at separate points such as the housed entrances 25 and 26, respectively, so that in case of accident to an adjoining apparatus, the tunnels will be protected from each other and the occupant of any one can make his escape without entering the other. The cleaner's rear vestibule connects with the superheater housing through an intermediate chamber 10 directly at the rear of the superheater which chamber communicates with the superheater through a door 27 and with the vestibule 16 through a hatch opening 28 provided with a cover 29. The door and hatch covering which are of reinforced concrete or other fireproof material, are to be kept closed during the operation of the superheater to prevent flame or hot gases from entering the tunnel 21. Other underground chambers are the rooms 17 and 18 separated by a wall 19ª of reinforced concrete or other suitable material. Indicating and controlling means associated with various portions of the apparatus, are situated in the room 17 hereinafter termed the control room, while the compressor and other portions of the apparatus are housed in the room 18 hereinafter termed the compressor room.

Figure 4:
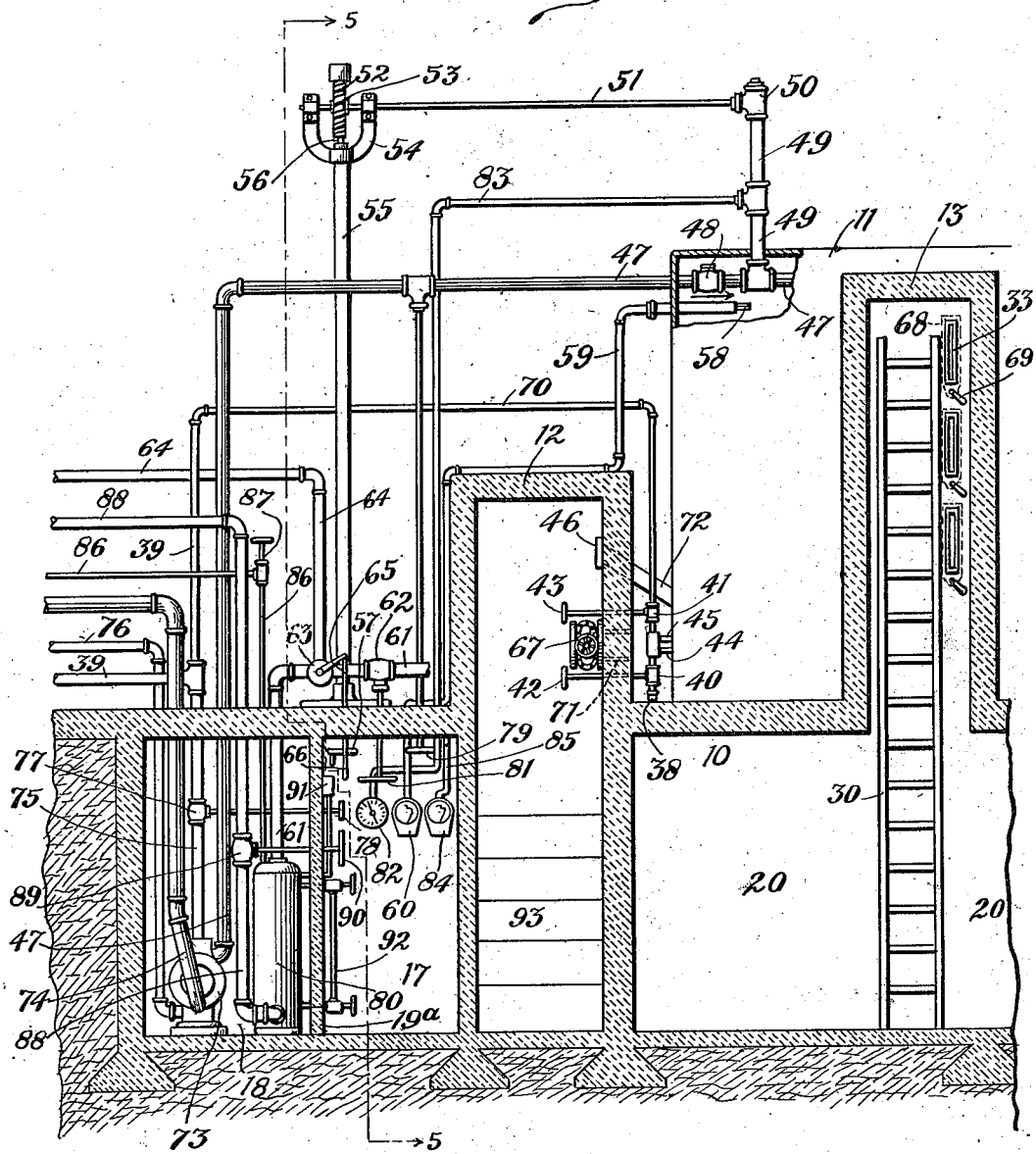
Fig. 4 is a vertical section taken on the line 4—4 of Fig. 3, on a larger scale.
Figure 5:
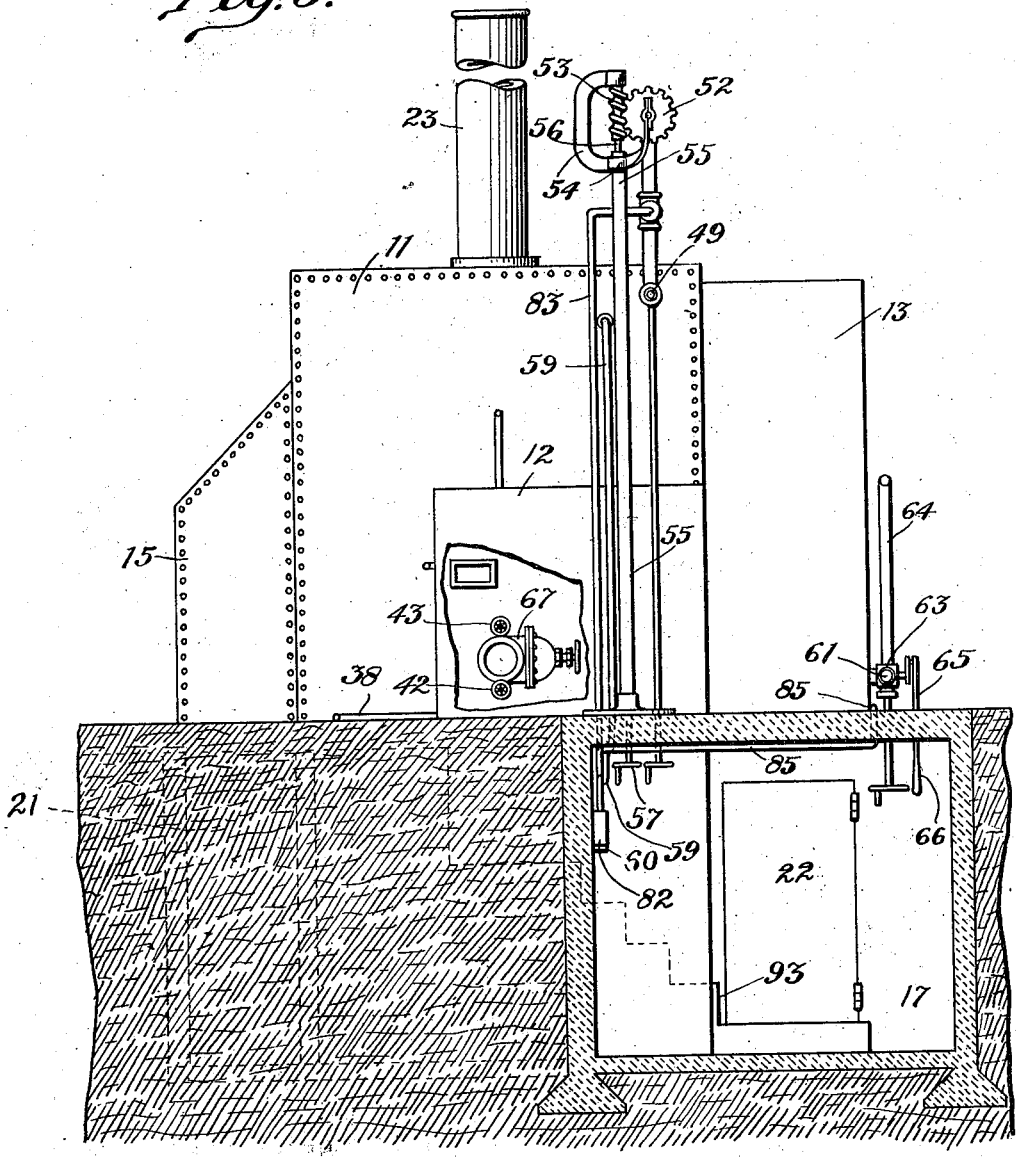
Fig. 5 is a vertical section on the line 5—5 of Figs. 3 and 4, and on the same scale as Fig. 4.
Figure 6:
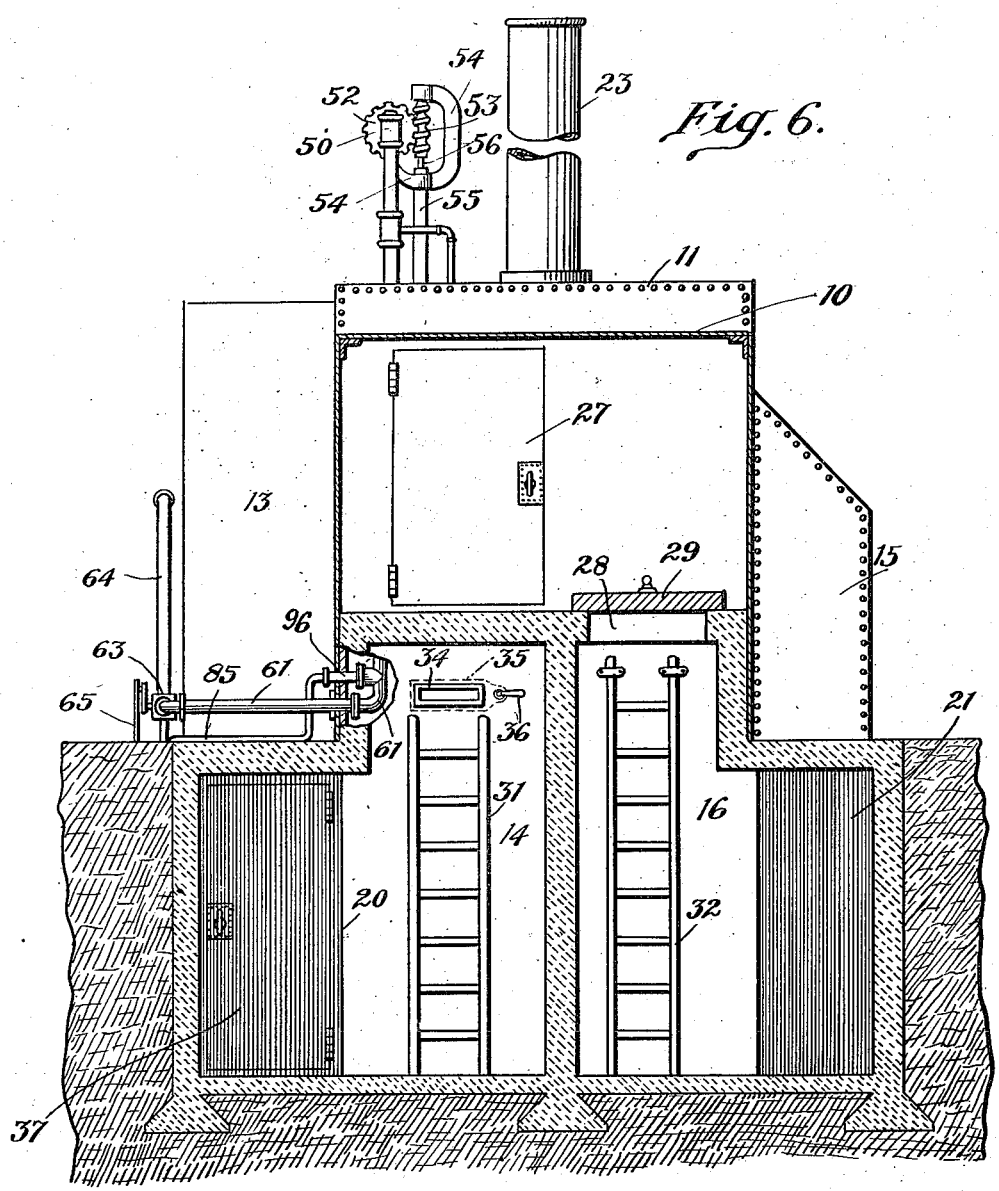
Fig. 6 is a rear elevation partly sectioned to show certain portions of the interior.

Ladders such as 30, 31 and 32, Figs. 4 and 6, are provided in the vestibules to enable the operator and cleaner to reach the level of the superheater. In the side observation vestibule 13, telltale openings 33 are provided at different levels, extending through to the interior of the superheater, each sealed with a heavy glass pane and normally shut off from the interior of the superheater by a shutter 68 controlled by a lever 69. So, also, a telltale opening 34 extends between the interior of the rear observation vestibule 14 and the superheater, and is provided with a heavy glass pane and a shutter 35 controlled by a lever 36 from the interior of the vestibule. Between vestibules 14 and 13, communication is controlled by a fireproof door 37, and between vestibule 13 and the remainder of the underground chambers by a fireproof door 22.

Control of the fuel supply to the superheater is had from within the fireman's vestibule by means of the valves 40 and 41 whose stems extend through the wall of the vestibule terminating in the interior thereof in hand wheels 42 and 43, respectively, the valve 40 controlling the flow of oil from a suitable reservoir, not shown, through the pipe 38 to the pipe 44, and the valve 41 controlling the flow of steam from a suitable source through the pipes 39 and 70 to the pipe 45. The pipes 44 and 45 terminate in the superheater in a suitable burner not shown. Access is had to the burner, for the purpose of kindling, through a tube 71 extending through an opening in the wall of the vestibule 12 in line with an opening in the superheater housing 11 through which the pipes 44, 45, enter. The tube 71 communicates with the interior of the vestibule through a gate-valve 67 to enable the opening through the tube to be kept normally closed. Observation of the burner is made through a tube 72 which extends from within the superheater housing through the wall of the vestibule 12, terminating in the vestibule in a heavily glazed window 46.

Hydrocarbon material is supplied to the superheater from a suitable source, not shown, through a pump or compressor 73 housed in the compressor room 18, which receives the hydrocarbon through a pipe 74 and delivers it to the superheater through the pipe 47. Steam is supplied to the compressor 73, for driving the same, through pipes 39 and 75, exhausting through pipe 76. This steam supply to the compressor is controlled by a valve 77 whose stem extends through the wall 19ª into the control room 17 terminating therein in a hand wheel 78. Included in the inlet pipe 47 is a check valve 48 arranged to pass fluid only in the direction indicated by the arrow for the purpose of protecting the compressor and pipe 47 within the compressor room in case the pressure in the superheater should rise beyond the limits for which the apparatus is designed. To take care of emergencies where the check valve might fail to work when a dangerous pressure is reached, a manually operated block valve is included in the pipe 47 above the control room 17 and has its stem extended down into the control room terminating therein in a hand wheel 79. To relieve abnormal pressure in the superheater, a pipe 49 is branched off from the intake pipe 47 between the check valve and the superheater, which branch leads upwardly outside of the superheater housing 11 through a manually operated relief valve 50. This valve is operated through means of the stem 51 which carries a worm wheel 52 meshing with a worm 53 whose shaft 56 extends downwardly into the operating room and terminates therein in a hand wheel 57, the worm gear 52—53 being supported by the bracket 54 carried on the tubular support 55 in which the worm shaft 56 is housed.

The hydrocarbon is led from the superheater through the outlet pipe 61 which extends from the rear of the superheater housing 11 along the outside of the apparatus and into the compressor room 18 where it terminates in a receiving tank 80. Inserted in the pipe 61 is a pressure control valve 62 whose stem extends into the control room terminating in a hand wheel 81. By operating this valve, to vary the flow of hydrocarbon from the superheater, the pressure in the superheater may be controlled. Gases accumulated in the receiving tank are led off through the pipe 86 to be used as fuel or condensed under pressure as desired. A relief valve 87 in the pipe 86 takes care of the abnormal pressure in the receiving tank 80. The hydrocarbon liquid accumulated in the receiving tank is discharged therefrom through a discharge pipe 88 to a final receiving tank not shown, this discharge being controlled by the valve 89 whose stem extends into the control room 17 terminating in a hand wheel 90. A pressure gage 91 and level gage 92 in the control room are connected with the receiving tank 80 to apprise the operator of the condition thereof.

The tube of the level gage may be of sufficient diameter to contain a hydrometer to indicate the specific gravity of the contents of the receiving tank.

A three-way valve 63 is also inserted in the pipe 61 between the pressure control valve 62 and the receiving tank for the purpose of directing the flow of hydrocarbon from the superheater through the pipe 64 to a suitable fractionater not shown. This valve is controlled by a rod 65 extending into the control room and terminating therein in a handle 66.

Pressure in the superheater is indicated by a pressure gage 82 in the control room connected through a pipe 83 and branch 49 with the inlet pipe 47. The temperature within the superheater housing or furnace is indicated on a recording temperature meter 60 connected with a thermo-couple 58 by suitable conductors led through the tubing 59. A second recording temperature meter 84 connects through the conductor tube 85 with a thermo-couple 96 extending into the outlet pipe 61 where it leaves the superheater for the purpose of indicating and recording the temperature of the hydrocarbon at this point.

The operation is as follows:

The operator, from the control room, starts the compressor 73 by turning the valve wheel 78 and pumps the proper amount of hydrocarbon into the superheater to give the desired pressure at a given temperature, preferably 700 pounds at 800° F., after which the compressor is stopped and a helper ascending the stairs 93 to the fireman's vestibule 12 opens the gate-valve 67, and after thrusting a lighted kindling torch through the tube 71 to the burner and again closing the gate-valve, operates the oil and steam valves 40, 41 by means of their respective valve wheels 42, 43 to regulate the flow of fuel to the burner, observation of the burner being had through the window 46. As the superheater heats up, the operator is apprised of the degree of pressure and temperature therein by means of the pressure gage 82 and temperature gages 60 and 84. If the pressure goes too high before the proper temperature is reached, he operates the pressure control valve 62 by means of the valve wheel 81 to reduce the pressure accordingly. When the proper working conditions obtain, the compressor is again started by turning the valve wheel 78 to gradually bring it to the normal speed, close watch being kept in the meantime of the pressure gage, and the pressure control valve operated to maintain the proper pressure in the superheater.

Should the operator at any time lose control of the pressure through the valve 62 by reason of its failure to work or because of a stoppage in the pipe 61 or superheater due to accumulation of carbon, the pressure in the superheater may be relieved by operating the hand wheel 57 to open the relief valve 50, back pressure through the inlet pipe 47 being prevented by the check valve 48.

While I have not shown or described in detail the structure of the protecting walls of the vestibules and underground chambers, it is to be understood that these are of a substantially bomb proof structure, preferably of heavily reinforced concrete.

From the arrangement here disclosed, it will be seen that that portion of the apparatus in which a high pressure and high temperature must be maintained is effectively isolated from the portions occupied by the attendants so that such attendants are at all times protected from the danger zone, which protection is further assured by having the high pressure portions above ground and in an open space where the force of an explosion will be dissipated, while the chambers occupied by the attendants are situated mainly underground to minimize the exposed portions.

Although only one entrance each is herein shown for the cleaners' and operators' tunnels, situated somewhat closely to the superheater housing because of limited space in the drawings, it is to be understood that in practice these points of entrance may be several in number and more remotely situated.

Having thus described my invention, what I claim and desire to secure by Letters Patent of the United States, is;

1. In apparatus of the class described, a still for high temperatures and pressures, and means for observing and controlling said temperatures and pressures by an operator located at a point removed from the still, together with a protected inclosure for the operator.

2. In apparatus of the class described, a still or retort, means for producing pressure and means for producing heat, in said still, and means for observing and controlling said heat and pressure producing means from an operator's position at a distance from the still.

3. In apparatus of the class described, a still structure upon a predetermined level, an operating chamber upon a different level, a passage from said operating chamber to the still for observation purposes, protective walls inclosing said chamber and passage, and indicating and controlling means located in said chamber, together with operative connection therefrom to the still.

4. In apparatus of the class described, an inclosed still and a detached protected operator's observation and controlling position as herein described and illustrated.

5. In apparatus of the class described, a still or retort for high temperatures and pressures, a housing for said retort, bomb-proof vestibules adjacent said housing with observation connections between them and the interior of the housing, and an underground passage connecting said vestibules.

6. In apparatus of the class described, a still or retort for high temperatures and pressures, a housing for said retort, operators' vestibules adjacent said housing with observation connections between them and the interior of the housing, cleaners' vestibules adjacent said housing communicating therewith with bomb-proof closures between the said cleaners' vestibules and the interior of the housing, an underground passage communicating with all of said operators' vestibules, and a second underground passage isolated from said first passage and communicating with all of said cleaners' vestibules, surface entrances for said passages situated at a distance from said still or retort, and bomb-proof houses for said entrances.

7. In apparatus of the class described, a still or retort for high temperatures and pressures, a housing for said retort, bomb-proof vestibules adjacent said housing with observation connections between them and the interior of the housing, an underground control room or chamber situated at a distance from the still or retort and communicating with said passage, and indicating and controlling apparatus in said control chamber operatively connected with said still or retort.

In testimony whereof I affix my signature.

FRANK E. WELLMAN.

Witnesses:
EDWARD E. CLEMENT,
L. D. SUMERWELL.